(12) United States Patent
Tocher et al.

(10) Patent No.: US 10,681,329 B2
(45) Date of Patent: Jun. 9, 2020

(54) PANORAMIC CAMERA HAVING MULTIPLE SENSOR SYSTEMS AND METHODS OF COLLECTING DATA OF AN ENVIRONMENT USING THE SAME

(71) Applicant: NCTech Ltd, Edinburgh (GB)

(72) Inventors: Neil Tocher, Edinburgh (GB); Cameron Ure, Edinburgh (GB); Mansour Ahmadian, Edinburgh (GB)

(73) Assignee: NCTech Ltd, Edinburgh (GB)

( * ) Notice: Subject to any disclaimer, the term of this patent is extended or adjusted under 35 U.S.C. 154(b) by 0 days.

(21) Appl. No.: 15/583,393

(22) Filed: May 1, 2017

(65) Prior Publication Data

US 2017/0324942 A1 Nov. 9, 2017

(30) Foreign Application Priority Data

May 6, 2016 (GB) .................................. 1607937.8

(51) Int. Cl.
| | |
|---|---|
| *H04N 13/156* | (2018.01) |
| *H04N 5/225* | (2006.01) |
| *H04N 13/271* | (2018.01) |
| *H04N 13/25* | (2018.01) |
| *H04N 13/246* | (2018.01) |
| *H04N 13/254* | (2018.01) |
| *H04N 13/243* | (2018.01) |
| *H04N 13/204* | (2018.01) |
| *H04N 13/167* | (2018.01) |
| *H04N 5/232* | (2006.01) |

(52) U.S. Cl.
CPC ......... *H04N 13/156* (2018.05); *H04N 5/2258* (2013.01); *H04N 5/23296* (2013.01); *H04N 13/167* (2018.05); *H04N 13/204* (2018.05); *H04N 13/243* (2018.05); *H04N 13/246* (2018.05); *H04N 13/25* (2018.05); *H04N 13/254* (2018.05); *H04N 13/271* (2018.05); *H04N 5/23238* (2013.01)

(58) Field of Classification Search
CPC ..................................................... H04N 13/155
See application file for complete search history.

(56) References Cited

U.S. PATENT DOCUMENTS

| | | | |
|---|---|---|---|
| 7,126,630 B1 * | 10/2006 | Lee ........................ | H04N 5/225 348/218.1 |
| 2004/0105573 A1 | 6/2004 | Neumann et al. | |
| 2005/0207487 A1 * | 9/2005 | Monroe .......... | G08B 13/19628 375/240.01 |

(Continued)

FOREIGN PATENT DOCUMENTS

WO WO 2016/095192 A1 6/2016

OTHER PUBLICATIONS

Intellectual Property Office, Search Report for Application No. GB1607937.8, dated Nov. 8, 2016, 3 pages, United Kingdom.

(Continued)

*Primary Examiner* — Tracy Y. Li
(74) *Attorney, Agent, or Firm* — Alston & Bird LLP

(57) ABSTRACT

A camera and associated method of operation, the camera comprising a plurality of sensor systems, each sensor system comprising at least one spatial sensor and at least one image sensor, wherein at least part of a field of view of one or more or each of the sensor systems differs to at least part of the field of view of at least one or each other of the sensor systems.

26 Claims, 6 Drawing Sheets

(56) References Cited

U.S. PATENT DOCUMENTS

| | | | |
|---|---|---|---|
| 2007/0031064 A1 | 2/2007 | Zhao et al. | |
| 2013/0107003 A1* | 5/2013 | Lim | G06T 13/40 |
| | | | 348/46 |
| 2014/0184496 A1* | 7/2014 | Gribetz | G02B 27/017 |
| | | | 345/156 |
| 2015/0054913 A1* | 2/2015 | Annau | G11B 27/11 |
| | | | 348/36 |
| 2016/0006951 A1* | 1/2016 | Moghadam | G03B 35/02 |
| | | | 348/164 |

OTHER PUBLICATIONS

European Patent Office, Extended European Search Report for Application No. 17168790.8, dated Jan. 17, 2018, 9 pages, Germany.

Kwon, et al., "Implementation of Human Action Recognition System Using Multiple Kinect Sensors", Nov. 22, 2015, Network and Parallel Computing; [Lecture Notes in Computer Science; Lect. Notes Computer], Springer International Publishing, pp. 334-343, Switzerland.

Shimura, et al., "Research on Person Following System Based on RGB-D Features by Autonomous Robot with Multi-Kinect Sensor", 2014 IEEE/SICE International Symposium On System Integration, Dec. 13-15, 2014, IEEE, pp. 304-309, Japan.

\* cited by examiner

PANORAMIC CAMERA HAVING MULTIPLE SENSOR SYSTEMS AND METHODS OF COLLECTING DATA OF AN ENVIRONMENT USING THE SAME

CROSS-REFERENCE TO RELATED APPLICATIONS

This application claims priority to and the benefit of United Kingdom Application No. 1607937.8, filed May 6, 2016, the contents of which as are hereby incorporated by reference in their entirety.

BACKGROUND

Technical Field

The present invention relates to a camera. In particular, the present invention relates to a spatial camera, such as a camera that can collect depth and image information.

Related Art

The development of virtual reality or VR headsets has reached the stage that such headsets are becoming mass market products. VR headsets are typically provided with means for providing individual stereographic images to each and sensors for tracking movements such as tilt and rotation of the head. In this way, VR headsets provide an immersive pseudo 3D experience, in which the user is provided with a pseudo 3D view of a virtual environment that changes according to the user's head movement in order to present the user with a view corresponding to the user's current head position and orientation.

However, the mass market potential of VR headsets gives rise to a corresponding need to provide content for VR headsets, particularly in the form of realistic pseudo 3D virtual models and environments that a user can freely navigate around using their 3D headsets. Examples of methods for producing such content include use of computer graphics and rendering packages and by collecting images using panoramic cameras. Computer graphics and rendering, although improving, still often appear artificial and can lack the required degree of realism.

Panoramic cameras are designed to provide a wide angle view of a scene. There are two basic types of camera: a rotating head camera, which is physically rotated to allow a panoramic image to be captured, and a fixed lens camera. Rotating head cameras provide a three hundred and sixty degree field of view, but they require a mechanical drive to cause physical rotation of the camera. Consequently, rotating head cameras tend to be large and relatively complex. Fixed lens cameras rely on wide angle lenses to capture images of a scene, which are then stitched together. Fixed lens cameras generally require complex optical arrangements to ensure that a three hundred and sixty degree field of view can be captured. However, images taken by panoramic cameras, although realistic, can lack the required depth in the images and may result in a situation in which a user can only view virtual environments from fixed locations for which suitable panoramic images are available, rather than being able to move around a virtual environment at will and look at objects from all directions, as they would in real life.

At least one aspect of one embodiment of the present invention seeks to overcome or minimise at least one problem in the prior art.

BRIEF SUMMARY

According to a first aspect of the present invention, there is provided a camera, the camera comprising a plurality of sensor systems, each sensor system comprising at least one spatial sensor and at least one image sensor. In certain embodiments at least part of a field of view of one or more or each of the sensor systems differs to at least part of the field of view of at least one or each other of the sensor systems. Optionally, at least one or each of the sensor systems may be oriented differently to at least one or each other of the sensor systems.

The spatial sensor may be configured to collect spatial data, which may comprise, describe or be usable to obtain location, size, shape and/or spatial extent of objects and/or surfaces within the field of view of the spatial sensor and/or in an environment to be imaged or modelled. The spatial sensor may comprise a depth, distance, angle and/or range sensor, which may be configured to determine distances and/or angles between the spatial sensor and locations on surfaces or objects within the field of view of the sensor and/or in the environment to be imaged or modelled. The spatial sensor may comprise a stereo sensor. At least one of the spatial sensors may comprise one or more transmitters and one or more receivers. In certain embodiments the spatial sensor may comprise at least two receivers and at least one transmitter. At least one or each spatial sensor may be or comprise an infra-red sensor, e.g. the transmitters and/or receivers may respectively be or comprise infra-red transmitter(s) and/or infra-red receiver(s). For example, the transmitter may be or comprise an infrared laser projector. The receiver may be or comprise an infrared camera. However, it will be appreciated that other spatial sensors may be used such as magnetic field sensors, optical sensors, sonic sensors, electromagnetic radiation sensors having a wavelength other than that associated with infra-red, such as visible light sensors, microwave sensors, ultra-violet sensors, and/or the like. It will also be appreciated that other suitable spatial sensor types would be apparent to a person skilled in the art and used herein.

The at least one image sensor may be configured to take images, e.g. visual and/or optical images, which may correspond to the field of view of the image sensor and/or be of at least part of the environment to be imaged or modelled. The at least one image sensor may comprise an optical imaging sensor. Examples of suitable imaging sensors include a charge-coupled device (CCD) imaging sensor, a complementary metal oxide silicon (CMOS) imaging sensor or other suitable imaging sensor. The imaging sensor may be a colour or RGB imaging sensor. The imaging sensor may be or comprise a visible light imaging sensor. The imaging sensor may be or comprise a system on chip camera. The at least one imaging sensor may comprise or be comprised in a digital camera.

In this way, it will be appreciated that the camera may be configured to obtain data or frames that comprise both image and spatial data, wherein the data or each frame may be representative of at least a portion of the environment to be imaged or modelled.

An example of a particularly suitable sensor system is an Intel Realsense™ sensor system. However, it will be appreciated that other suitable sensor systems may be used.

The camera may comprise at least three, and in certain embodiments four or more, sensor systems.

In certain embodiments part of the field of view of at least one or more or each sensor system may overlap part, but not all, of the field of one or more other sensor system, such as one or more or each adjacent sensor system. However, in embodiments, at least part or all of the field of view of at least one or more or each of the sensor systems may not overlap the field of view of one or more or each other sensor system, e.g. adjacent sensor system. The field of view of the sensor system may correspond with an overlapping region of the field of view of the at least one imaging sensor and the at least one spatial sensor, e.g. a field of view from which the sensor system may collect both spatial data and images.

At least one or each sensor system may in certain embodiments be an integral or unitary sensor system, e.g. at least the spatial sensor(s) and the imaging sensor(s) for a given sensor system may be combined together into a single integral unit, which may optionally be within a single housing and/or the spatial sensor(s) and the imaging sensor(s) may be mounted onto a common frame, chassis or board and/or may share processing and/or control electronics, which may also be provided mounted to the common frame, chassis or board. At least one or each sensor system may comprise a processor, which may be configured to process data from and/or control the at least one transmitter and the at least one receiver of the associated sensor system. However, it will be appreciated that in other embodiments, the spatial sensor(s) and imaging sensor(s) may be provided separately or individually and need not be part of an integral or unitary system.

As indicated above, at least one or more or each sensor system may be tilted or oriented differently to at least one or more or each other sensor system. An optical or central axis of the field of view of at least one or more or each sensor system (or the spatial sensor(s) and/or imaging sensor(s) thereof) may be angled differently to that of at least one or more or each other sensor system. The sensor systems or the respective optical and/or central axes of the field of view of at least two or more or each of the sensor systems (or the spatial sensor(s) and/or imaging sensor(s) thereof) may be distributed or spaced apart over at least one direction or over at least one axis or surface, such as a vertical direction or axis, in use.

The sensor systems and/or the respective optical and/or central axes of the field of view of at least two or more or each of the sensor systems (or the spatial sensor(s) and/or imaging sensor(s) thereof) may be distributed over a curved axis or surface, such as (but not limited to) a cylindrical or hemi-cylindrical surface, a hemispherical or spherical surface or a spherical section, a parabolic surface, a hyperbolic surface, a spline surface and/or the like. In certain embodiments the sensor systems may be distributed over a convex surface and/or the fields of view or optical axes of respective sensor systems may be mutually divergent, e.g. to increase the overall field of view of the camera. However, it will be appreciated that the sensor system may alternatively be distributed over a concave surface and/or the fields of views of respective sensor systems may be mutually convergent, e.g. when focussed imaging or imaging of a small total field of view is required. However, in embodiments, one or more of the sensor systems may be provided on facets facing in different directions.

In view of the above, it will be appreciated that the camera may comprise an array of sensor systems and that the sensors systems may all face in the same general direction or from the same side of the camera but at different angles and/or that some or all of the sensor systems may face in different directions and/or from different sides of the camera. For example, at least one sensor system may face obliquely, perpendicularly or in an opposite direction to at least one other sensor system. This may be desirable in certain applications (particularly those in which the camera isn't rotated) to increase or maximise the overall field of view.

For example, in specific but not essential embodiments, the sensor systems may be grouped into two or more sensor system groups, wherein each sensor system group comprises one or more sensor systems. At least one, potentially two but optionally more than two pairs of sensor system groups may be provided. Each sensor system group of each pair may face in an opposite direction to the other sensor system group in the respective pair. The sensor systems of one of the pairs of sensor system groups may face obliquely or substantially perpendicularly to at least one or each corresponding sensor system of the other pair of sensor system groups. Each of the sensor system groups may face substantially perpendicularly to each adjacent sensor system group.

The camera may comprise a housing, which may be or comprise a cylindrical or hemi-cylindrical housing, a hemispherical or spherical housing, a multifaceted housing and/or the like. At least one or each of the sensor systems may be provided in or on the housing, e.g. in or on at least one or more curved surface or facet of the housing.

At least two or more or each of the sensor systems may be arranged one above the other, in use, in at least one mode of operation.

The camera may be operable in a plurality of modes. For example, the camera may be operable in a mounted and/or rotation mode. In the mounted and/or rotation mode, the camera may be configured to collect images and/or spatial data whilst the camera is mounted on a stand, tripod or other support. In the mounted and/or rotation mode, the camera may be configured to collect images and/or spatial data whilst at least one or all of the sensor systems are being rotated and/or between rotations of the at least one or all of the sensor systems, e.g. around a rotation axis, and/or at one or more different rotational positions around a rotation axis. The camera may be operable in roaming mode. In the roaming mode, the camera may be movable, positionable and/or orientable, e.g. freely and/or manually movable, positionable and/or orientable. In the roaming mode, the camera may be hand held and/or detached from the stand, tripod or other support.

At least part or all of the camera may be rotatable, e.g. when in the rotation mode. At least part of the camera may be rotatable relative to at least one other part, e.g. when in the rotation mode.

The camera may comprise a mount. The mount may be mountable or mounted to, or configured to receive, the stand, tripod or other support for supporting the camera. The mount may be or comprise a rotatable mount. The mount may be adapted to produce relative rotation of the mount and at least part or all of the rest of the camera, e.g. when in the rotating and/or mounted mode. The camera may be configured such that at least part of the camera (such as a part of the camera comprising at least one or each of the sensor systems) rotates or spins, for example relative to the mount and/or the tripod or stand or other support, e.g. when in the mounted or rotation mode. The camera may comprise a motor, such as a stepper motor, for rotating the camera, e.g. for rotating at least part of the camera relative to the mount and/or relative to the tripod, stand or other support.

At least part of the camera (such as a part of the camera comprising at least one or each of the sensor systems) may be rotatable around a rotation axis, e.g. when in the rotation mode. At least part of the camera (such as a part of the camera comprising at least one or each of the sensor systems) may be rotatable around a substantially vertical rotation axis, in use, e.g. when in the rotation mode. However, in other embodiments, at least the part of the camera may be rotatable around a different axis, such as a substantially horizontal or oblique axis, in use. The plurality of sensor systems, e.g. the respective optical or central axes of the plurality of sensor systems, may be distributed over an axis, direction or surface that is parallel, co-linear or generally co-directional to the rotation axis.

Each sensor system or at least each of the imaging sensors may be located as closely together as possible. Each sensor system or at least each of the imaging sensors may be arranged co-linearly, e.g. along a curved or straight line, wherein the line may correspond to the shape of the surface on which the sensor systems are provided. The respective optical axes of each of the sensor systems or imaging sensors may be co-planar, wherein said plane may optionally extend perpendicularly to a long axis of the camera. The imaging sensors of one or more or each of the sensor systems may be arranged along, on, or near (e.g. within 2 cm, preferably within 1 cm and most preferably within 0.4 cm) the rotational axis or a surface or axis substantially parallel, co-linear or generally co-directional thereto. The imaging sensor(s) of one or more or each of the sensor systems may overlap the rotational axis when viewed along the optical or imaging axis of the respective imaging sensor. At least one receiver of one or more or each of the sensor systems may be provided on one side of the rotational axis and at least one other receiver of the respective sensor system may be provided on another or opposite side of the rotational axis. The transmitters of one or more or each of the sensor systems may be arranged along, on or near (e.g. within 2 cm, preferably within 1 cm and most preferably within 0.4 cm) the rotational axis or a surface or axis substantially parallel, co-linear or generally co-directional thereto.

In this way, parallax errors may be reduced, minimized or avoided.

The camera may comprise or in certain embodiments be configured to communicate with a control and/or processing system. For example, the camera may comprise a communications module, which may comprise one or more wired and/or wireless communications means or links, which may be configured to communicate with the control and/or processing system.

The processing system may be configured to create a model, composited image or virtual environment, such as a spatial or 3D model, image or virtual environment, e.g. from the spatial data and/or the images collected and/or received from at least one or more or each of the sensor systems. The model, composited image or virtual environment may be of, or correspond to, the environment to be imaged or modelled. The processing system may be configured to create the model, composited image or virtual environment by combining or compositing the images collected by the image sensors with spatial data collected by the spatial sensors. The processing system may be configured to composite or combine together images collected by the image sensors of a plurality or each of the sensor systems and/or the spatial data collected by the spatial sensors of a plurality or each of the sensor systems.

The processing system may be configured to form a 3D skeleton, framework or construct, e.g. from the spatial data collected using at least one or more or each of the spatial sensors. The 3D skeleton, framework or construct may comprise or define positions, spatial extents, shapes and/or orientations of one or more surfaces and/or objects. The processing system may be configured to wrap, skin or overlay the 3D skeleton, framework or construct with at least one or more images collected using at least one or more or each of the imaging sensors or a combined image formed therefrom, e.g. to form the model, composited image or virtual environment. The processing system may be configured to alter or configure or reorient the one or more or each image to conform to the 3D skeleton, framework or construct, e.g. to the spatial arrangement, surfaces and/or contours of the 3D skeleton, framework or construct.

The camera may be configured to collect a plurality of images and/or to collect a range of spatial data. At least one or some or all of the images and/or spatial data may be for or correspond to parts of the environment to be imaged or modelled. At least part of one or more of the images and/or at least some of the spatial data may be for, or correspond to, the same parts of the environment to be imaged or modelled. At least one or more of the images and/or at least some of the spatial data may be for, or correspond to, different parts of the environment to be imaged or modelled. At least one or more or all of the images and/or at least some or all of the spatial data may at least partially or entirely overlap with one or more or each of the other images or spatial data. At least some or all of the images and/or at least some or all of the spatial data may not overlap one or more or each other image and/or spatial data. The camera may be configured to collect images and/or spatial data from a plurality of viewpoints, perspectives, locations, orientations and/or rotational positions.

The processing system may be configured to combine or composite together images and/or spatial data, e.g. to at least partly form the model, composited image or virtual environment. The images and/or spatial data that are combined or composited together may be collected during one or more, e.g. a plurality of, rotations and/or at one or more rotational positions of the camera. The processing system may be configured to composite together images and/or spatial data collected in the roaming mode with images and/or spatial data collected during one or more rotations or rotational positions of the camera, e.g. collected during the rotation and/or mounted mode.

The processing system may be configured to composite, average, merge, smooth together or combine a plurality of images and/or spatial data that at least partially overlap, cover or are associated with the same part or area of the environment to be imaged or modelled, e.g. to form combined images and/or combined spatial data. The processing system may be configured to composite, combine or stitch together a plurality of images and/or spatial data that are at least partially or wholly non-overlapping, or at least partially cover or are associated with different parts or areas of the environment to be imaged or modelled. For example, the images and/or spatial data may come from one or more rotations or partial rotations of the camera on the support, mount, stand or tripod when the camera is being used in the rotation or mounted mode, and/or at one or more positions and/or orientations when being used in the roaming mode.

The camera may be configured to collect images with the imaging sensor(s) and/or spatial data with the spatial sensor(s) using a plurality of, e.g. range of, settings of at least one or each of the imaging sensors and/or spatial sensors. For example, the camera may be configured to collect one or more or each image at different settings, to at least one or each other images. The different setting may comprise different exposures, frame rates, resolutions, contrasts, apertures, colour balances, and/or the like. The one or more images and the one or more other images may be or comprise at least partially or entirely overlapping images. The camera may be configured to collect spatial data at different settings to other spatial data. The different settings may comprise different gain, power, sensitivity and/or the like. The spatial data and the other spatial data may be or comprise spatial data for at least partially or entirely overlapping parts of the environment to be imaged or modelled. The processing system may be configured to combine a plurality of at least partially or wholly overlapping images and/or spatial data, which may be collected with different settings, in order to form a combined image and/or combined spatial data.

The camera may be configured to provide high dynamic range (HDR) imaging. The processing system may be configured to produce the HDR images from the plurality of images collected with different settings, e.g. with different exposures. By using combined images that are a combination of a plurality of images for parts of the environment to be modelled or imaged, the images to be combined preferably being collected with different image sensor settings, improved quality images can be obtained.

Furthermore, different settings of the spatial sensors may result in the spatial sensor being more or less sensitive to different surfaces. By collecting spatial data using a range or plurality of settings of the spatial sensors, such as gain, power, sensitivity and/or the like, the camera may more accurately determine and/or account for variations in surface types.

The camera and/or processing system may be configured to determine which part of the model, composite image or virtual environment the image or spatial data is associated with or belongs to. For example, the camera and/or processing system may be configured to implement pattern matching (e.g. by matching at least parts of images at least with parts of other images and/or the model, composite image or virtual environment), model matching (e.g. by matching the spatial data and with other spatial data and/or at least part of the 3D skeleton, framework or construct and/or at least part of the model, composite image or virtual environment), image matching and/or other similar techniques, to determine which part of the model, composite image or virtual environment that image or spatial data is associated with or belongs to. Additionally or alternatively, the camera may comprise one or more location and/or orientation sensors, such as GPS sensors, accelerometers, level sensors, gyroscopes, inclinometers, tilt sensors, rotational sensors, angle encoders, and/or any other suitable location and/or orientation sensors known in the art. The camera or processing system may be configured to determine which part of the model, composite image or virtual environment the image or spatial data is associated with or belongs to from the location and/or orientation data associated with the respective images or spatial data.

Since the camera and/or processing system may determine where in the model image and/or spatial data belongs, e.g. by using pattern or model matching and/or by using location and/or orientation sensors and/or the like, the roaming mode may be easier to implement and/or distortions or artefacts due to, for example, inaccuracies in the rotation amount of the camera, may be compensated for.

The processing system may form or have access to the model, composite image or virtual environment that corresponds to the environment being imaged or modelled by the camera. The processing system may also know the position and orientation of the camera within the environment being imaged or modelled. The processing system may therefor determine where in the model, composite image or virtual environment the images and spatial data being collected using the camera belong.

For example, the camera may be mounted on the stand, tripod or other support and rotated one or more times on the stand, tripod or other support whilst collecting spatial data and images in order to build up the model, composite image or virtual environment. The stand, tripod or other support may then be moved and the process repeated and used to supplement the model, composite image or virtual environment with further spatial data and images collected from a different perspective, viewpoint or position. Similarly, the camera could be removed from the stand, tripod or other support and used in the roaming mode. The data collected from subsequent stand, tripod or other support positions and/or during roaming mode may then be composited into the 3D model by determining where in the model the collected spatial and image data belongs, e.g. by using or correlating the measured location and/or orientation of the camera with the existing model. In this way, for example, multiple stand, tripod or other support positions and/or the roaming mode may be used to collect spatial data and/or images for locations for which spatial data and/or images weren't previously collected (e.g. corresponding to locations behind or under objects) or to supplement and enhance already collected data and images.

The images may be, comprise or be comprised in moving or video images and/or still images. It will be appreciated that the sensor system may be configured to collect frames representative of a portion of the environment to be imaged or modelled, wherein each frame may comprise image and depth information and that these frames may be or comprise still images and/or frames of a video or moving image. It will also be appreciated that the frames may be combined or composited together to generate the model, composite image or virtual environment.

The processing system may be configured to apply image and/or spatial data correction, e.g. to the images collected by at least one or each of the image sensors and/or the spatial data collected by at least one or each of the spatial sensors. The correction may comprise correcting for chromatic aberrations, colour corrections, image distortions, light or exposure defects and/or the like.

The processing system may be configured to store or access calibration data, which may be calibration data specifically associated with the camera. The calibration data may be pre-installed during manufacture. Alternatively or additionally, the calibration data may be collected using the camera, e.g. after manufacture. Calibration data may be collected periodically and/or at specified time intervals or responsive to a user action. The calibration data may be collected by collecting spatial and/or imaging data of a calibration or reference system, such as a calibration or reference environment, object or display. In this way, the camera may be calibrated in use. The processing system may be configured to apply image and/or spatial data correction using the calibration data.

According to an aspect of the present invention is a method of collecting modelling and/or imaging data of an environment to be imaged or modelled, the method comprising collecting spatial data and images of the environment using a camera having a plurality of sensor systems, each sensor system comprising at least one spatial sensor and at least one image sensor. In certain embodiments at least part of a field of view of at least one of the sensor systems differs to at least part of the field of view of at least one other of the sensor systems. The method in certain embodiments comprises collecting one or more images of at least part of the environment using the at least one image sensor of the plurality of sensor systems and collecting spatial data for the environment using the at least one spatial sensor of the plurality of sensor systems.

The method may comprise using the camera of the first aspect.

The method may comprise operating the camera in a plurality of modes. For example, the method may comprise operating the camera in a mounted and/or rotation mode. The method may comprise collecting images and/or spatial data whilst the camera is mounted on a stand, tripod or other support. The method may comprise collecting images and/or spatial data whilst at least one or all of the sensor systems are being rotated or between rotations, e.g. around a rotation axis, and/or at one or more different rotational positions around a rotation axis. The method may comprise operating the camera in a roaming mode. The method may comprise moving, repositioning and/or re-orienting, e.g. freely and/or manually moving, repositioning and/or re-orienting, the camera and collecting images and/or spatial data at different positions and/or orientations of the camera. The method may comprise collecting images and/or spatial data whilst the camera is hand held and/or detached from the stand, tripod or other support.

The method may comprise mounting the camera, e.g. a mount of the camera, to a stand, tripod or other support for supporting the camera. The method may comprise rotating at least part or all of the rest of the camera relative to the mount. The method may comprise rotating at least part of the camera (such as a part of the camera comprising at least one or each of the sensor systems) around a substantially vertical rotation axis. The method may comprise rotating at least the part of the camera around a different axis, such as a substantially horizontal or oblique axis.

The method may comprise using the camera to collect a plurality of images and/or to collect a range of spatial data. At least one or some or all of the images and/or spatial data may be for or correspond to parts of the environment to be imaged or modelled. At least one or more of the images and/or at least some of the spatial data may be for, or correspond to, the same parts of the environment to be imaged or modelled. At least one or more of the images and/or at least some of the spatial data may be for or correspond to different parts of the environment to be imaged or modelled. At least one or more or all of the images and/or at least some or all of the spatial data may at least partially or entirely overlap with one or more or each of the other images or spatial data. At least some or all of the images and/or at least some or all of the spatial data may not overlap one or more or each other image and/or spatial data. The method may comprise collecting images and/or spatial data from a plurality of viewpoints, perspectives, locations, orientations and/or rotational positions of the camera.

The method may comprise collecting images and/or spatial data using the imaging sensor(s) and/or the spatial sensor(s) with a plurality of, e.g. range of, settings of at least one or each of the imaging sensors and/or spatial sensors. The method may comprise collecting one or more images at different settings, such as different exposures, frame rates, resolutions, contrasts, apertures, colour balances, and/or the like to at least one or more other images. The one or more images and the one or more other images may be or comprise at least partially or entirely overlapping images. The method may comprise collecting spatial data at different settings, such as different gain, power, sensitivity and/or the like to other spatial data. The spatial data and the other spatial data may be or comprise spatial data for at least partially or entirely overlapping parts of the environment to be imaged or modelled.

The method may comprise rotating the camera one or more times on the stand, tripod or other support whilst collecting spatial data and images at one or more rotational positions in order to build up the model, composite image or virtual environment. The method may comprise moving the stand, tripod or other support and repeating the process, which may be used to supplement the model, composite image or virtual environment with further spatial data and images collected from a different perspective, viewpoint or position. The method may comprise removing the camera from the stand, tripod or other support.

According to a third aspect of the present invention is a processing system for creating a model, composited image or virtual environment, the processing system comprising at least one processor for creating the model, composited image or virtual environment and data storage for storing one or more images and spatial data of an environment to be imaged or modelled, and optionally a communications or interface module for receiving the images and/or spatial data.

The one or more images and spatial data may be collected using a camera according to the first aspect and/or a method according to the second aspect. The processing system may be comprised in, be connected or be connectable to, or adapted to communicate with the camera of the first aspect. The processing system may be comprised in an assembly or system with the camera of the first aspect.

The processing system may be configured to create the model, composited image or virtual environment, such as a spatial or 3D model, image or virtual environment, e.g. from the spatial data and/or the images collected and/or received from at least one or more or each of the sensor systems. The model, composited image or virtual environment may be of, or correspond to, the environment to be imaged or modelled. The processing system may be configured to create the model, composited image or virtual environment by combining or compositing the images collected by the image sensors with spatial data collected by the spatial sensors. The processing system may be configured to composite or combine together images collected by the image sensors of a plurality or each of the sensor systems and/or the spatial data collected by the spatial sensors of a plurality or each of the sensor systems.

The processing system may be configured to form a 3D skeleton, framework or construct, e.g. from the spatial data collected using at least one or more or each of the spatial sensors. The 3D skeleton, framework or construct may comprise or define positions, spatial extents, shapes and/or orientations of one or more surfaces and/or objects. The processing system may be configured to wrap, skin or overlay the 3D skeleton, framework or construct with at least one or more images collected using at least one or more or each of the imaging sensors, e.g. to form the model, composited image or virtual environment. The processing system may be configured to alter or configure the one or more or each image to conform to the 3D skeleton, framework or construct, e.g. to the spatial arrangement, surfaces and/or contours of the 3D skeleton, framework or construct.

The processing system may be configured to combine or composite together images and/or spatial data to at least partly form the model, composited image or virtual environment. The images and/or spatial data that are combined or composited together may be collected during one or more, e.g. a plurality of, rotations or at one or more rotational positions of the camera. The processing system may be configured to composite together images and/or spatial data collected in the roaming mode with images and/or spatial data collected during one or more rotations or rotation positions of the camera, e.g. collected during the rotation and/or mounted mode.

The processing system may be configured to determine which part of the model, composite image or virtual environment the image or spatial data is associated with or belongs to. For example, the processing system may be configured to implement pattern matching (e.g. by matching at least parts of images at least with parts of other images and/or the model, composite image or virtual environment), model matching (e.g. by matching the spatial data and with other spatial data and/or at least part of the 3D skeleton, framework or construct and/or at least part of the model, composite image or virtual environment), image matching and/or other similar techniques, to determine which part of the model, composite image or virtual environment that image or spatial data is associated with or belongs to. The processing system may be configured to determine which part of the model, composite image or virtual environment the image or spatial data is associated with or belongs to from location and/or orientation data associated with respective images or spatial data. The location and/or orientation data may be, comprise or be derived from location and/or orientation data collected using one or more location and/or orientation sensors of the camera, e.g. during collection of the images and/or spatial data.

The processing system may create or have access to the model, composite image or virtual environment that corresponds to the environment being imaged or modelled by the camera. The processing system may also know the position and orientation of the camera within the environment being imaged or modelled. The processing system may determine where in the model, composite image or virtual environment the images and spatial data being collected using the camera belong.

The processing system may be configured to apply image and/or spatial data correction, e.g. to the images collected by at least one or each of the image sensors and/or the spatial data collected by at least one or each of the spatial sensors. The correction may comprise correcting for chromatic aberrations, colour corrections, image distortions, light or exposure defects and/or the like.

The processing system may be configured to store or access calibration data, which may be calibration data specifically associated with the camera. The calibration data may be pre-installed during manufacture. The processing system may be configured to apply image and/or spatial data correction using the calibration data.

According to a fourth aspect of the present invention is a method for creating a model, composited image or virtual environment from one or more images and spatial data of an environment to be imaged or modelled. At least one of the images and/or at least some of the spatial data may relate to a different field of view to at least one other of the images and/or at least some other spatial data.

The one or more images and spatial data may be collected using a camera according to the first aspect and/or a method according to the second aspect. The method may be performed on or using the processing system of the third aspect.

The method may comprise creating the model, composited image or virtual environment, such as a spatial or 3D model, image or virtual environment, e.g. from the spatial data and/or the images collected and/or received from at least one or more or each of the sensor systems. The model, composited image or virtual environment may be of or correspond to the environment to be imaged or modelled. The method may comprise creating the model, composited image or virtual environment by combining or compositing the images collected by the image sensors with spatial data collected by the spatial sensors. The method may comprise compositing or combining together images collected by the image sensors of a plurality or each of the sensor systems and/or the spatial data collected by the spatial sensors of a plurality or each of the sensor systems.

The method may comprise forming a 3D skeleton, framework or construct, e.g. from the spatial data collected using at least one or more or each of the spatial sensors. The 3D skeleton, framework or construct may comprise or define positions, spatial extents, shapes and/or orientations of one or more surfaces and/or objects. The method may comprise wrapping, skinning or overlaying the 3D skeleton, framework or construct with at least one or more images collected using at least one or more or each of the imaging sensors, e.g. to form the model, composited image or virtual environment. The method may comprise altering or configuring the one or more or each image to conform to the 3D skeleton, framework or construct, e.g. to the spatial arrangement, surfaces and/or contours of the 3D skeleton, framework or construct.

The method may comprise compositing data collected from subsequent stand, tripod or other support positions and/or when the camera is removed from the stand into the 3D model by determining where in the model the collected spatial and image data belongs, e.g. by using or correlating the measured location and/or orientation of the camera with the existing model.

The method may comprise combining or compositing together images and/or spatial data to at least partly form the model, composited image or virtual environment. The images and/or spatial data that are combined or composited together may be collected during one or more, e.g. a plurality of, rotations or at one or more rotational positions of the camera. The method may comprise compositing together images and/or spatial data collected in the roaming mode with images and/or spatial data collected during one or more rotations or rotation positions of the camera, e.g. collected during the rotation and/or mounted mode.

The method may comprise determining which part of the model, composite image or virtual environment the image or spatial data is associated with or belongs to. The method may comprise performing pattern matching (e.g. by matching at least parts of images at least with parts of other images and/or the model, composite image or virtual environment), model matching (e.g. by matching the spatial data and with other spatial data and/or at least part of the 3D skeleton, framework or construct and/or at least part of the model, composite image or virtual environment), image matching and/or other similar techniques, to determine which part of the model, composite image or virtual environment that image or spatial data is associated with or belongs to. The method may comprise determining which part of the model, composite image or virtual environment the image or spatial data is associated with or belongs to from location and/or orientation data associated with respective images and/or spatial data. The location and/or orientation data may be collected by one or more location and/or orientation sensors of the camera used to collect the images and/or spatial data.

The method may comprise apply image and/or spatial data correction, e.g. to the images collected by at least one or each of the image sensors and/or the spatial data collected by at least one or each of the spatial sensors. The correction may comprise correcting for chromatic aberrations, colour corrections, image distortions, light or exposure defects and/or the like.

The method may comprise accessing calibration data, which may be calibration data specifically associated with the camera. The method may comprise applying image and/or spatial data correction using the calibration data.

According to a fifth aspect of the present invention is a computer program product that, when loaded onto a processing and/or control apparatus and/or a camera comprising a processor, causes the processing and/or control apparatus and/or the camera to implement the method of the second aspect or fourth aspect. The computer program product may be provided on a carrier medium. The carrier medium may be a tangible, non-transient carrier medium, such as a flash drive, memory stick, optical disk or carrier, magnetic disk or carrier, memory, ROM, RAM, and/or the like. The carrier medium may be, comprise or be comprised in a non-tangible carrier medium such as an electromagnetic wave, electronic or magnetic signal, digital data and/or the like.

It should be understood that the features defined above in accordance with any aspect of the present invention or below in relation to any specific embodiment of the invention may be utilised, either alone or in combination with any other defined feature, in any other aspect or embodiment of the invention. Furthermore, the present invention is intended to cover apparatus configured to perform any feature described herein in relation to a method and/or a method of using or producing or manufacturing any apparatus feature described herein.

BRIEF DESCRIPTION OF THE FIGURES

Various aspects of the invention will now be described by way of example only and with reference to the following drawings, of which.

DETAILED DESCRIPTION OF VARIOUS EMBODIMENTS

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Figure 1:
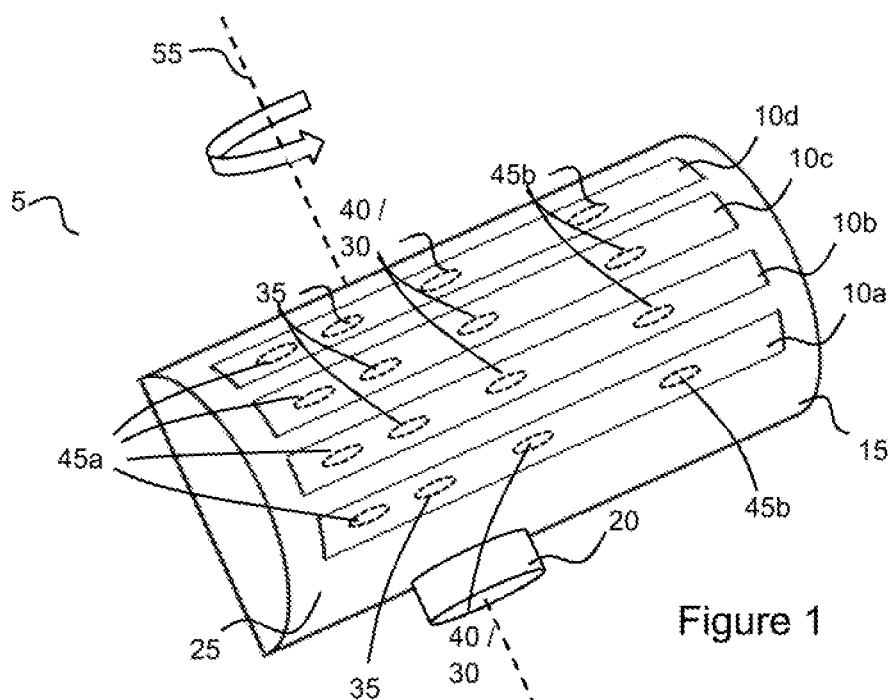
FIG. 1 is a perspective view of a camera.

FIG. 1 shows a panoramic camera 5 for capturing images and spatial data associated with the images. The camera 10 of FIG. 1 comprises four sensor systems 10a, 10b, 10c, 10d, a housing 15 and a mount 20. The housing 15 is hemi-cylindrical and the four sensor systems 10a, 10b, 10c and 10d are distributed over a curved surface 25 of the housing 15. In this case, each sensor system 10a, 10b, 10c, 10d extends in parallel to each other sensor system 10a, 10b, 10c, 10d and are distributed over a curved axis corresponding to the curved surface 25 of the housing 15. Each sensor system 10a, 10b, 10c, 10d is angled to correspond with the curvature of the curved surface 25.

Figure 2:
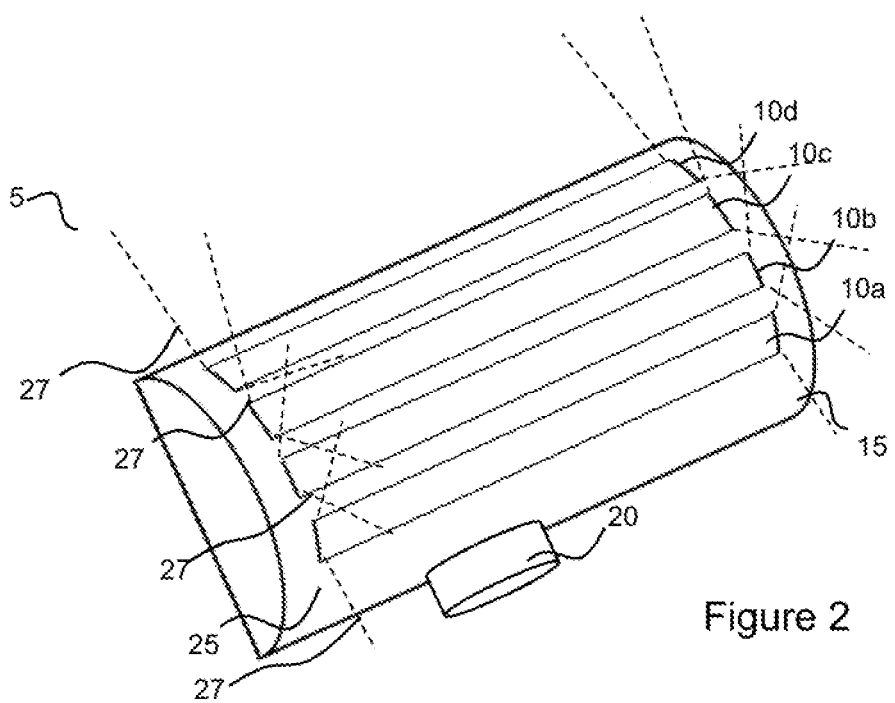
FIG. 2 is a perspective view showing the fields of view of sensor systems of the camera of FIG. 1.

As such, each of the sensor systems 10a, 10b, 10c, 10 is oriented differently to each of the other sensor systems 10a, 10b, 10c, 10d. In particular, the fields of view of each of the sensor systems 10a, 10b, 10c, 10d are oriented differently, such that the field of view 27 of each sensor system 10a, 10b, 10c, 10d only partially overlaps that of the adjacent sensor systems 10a, 10b, 10c, 10d, as shown in FIG. 2. In this way, the total field of view of the camera 5 corresponds to the sum of the fields of view 27 of each of the sensor systems 10a, 10b, 10c, 10d. In this particular example, the total field of view of the camera 5 in this example is substantially 180°.

Each of the sensor systems 10a, 10b, 10c, 10d comprises at least one spatial sensor 30 and at least one imaging sensor 35. The spatial sensor 30 in this example is an infra-red spatial sensor comprising an infra-red emitter 40 and a pair of spaced apart infra-red receivers 45a, 45b that are configured to pick up reflections of the infra-red signal emitted by the infra-red emitter 40. It will be appreciated that the spatial sensor 30 is a stereoscopic sensor that is operable to determine distances and angles between the spatial sensor 30 and any objects and surfaces in the spatial sensor's field of view using techniques that would be apparent to a person skilled in the art, which may comprise, as non-limiting examples, time-of-flight analysis, analysis of relative intensities and receiving times of the signal from the associated emitter 40 at each receiver 45a, 45b and the like. In this way, the spatial sensor 30 of each sensor system 10a, 10b, 10c, 10d is operable to collect spatial data that is representative of distances and angles from the respective spatial sensor 30 to parts of the objects and surfaces that are within the field of view of, and visible to, the respective spatial sensor 30.

The imaging sensor 35 is in the form of a digital colour (RGB) camera and can be based on a CMOS, CCD or other suitable digital imaging technology. In certain embodiments, the imaging sensor 35 is a system-on-chip (SoC) imaging sensor. The imaging sensor 35 is operable to collect colour images that at least partly or wholly encompass the field of view of the associated sensor system 10a, 10b, 10c, 10d. It will be appreciated that the imaging sensor 35 is operable to collect still images, moving or video images or both.

Figure 4:
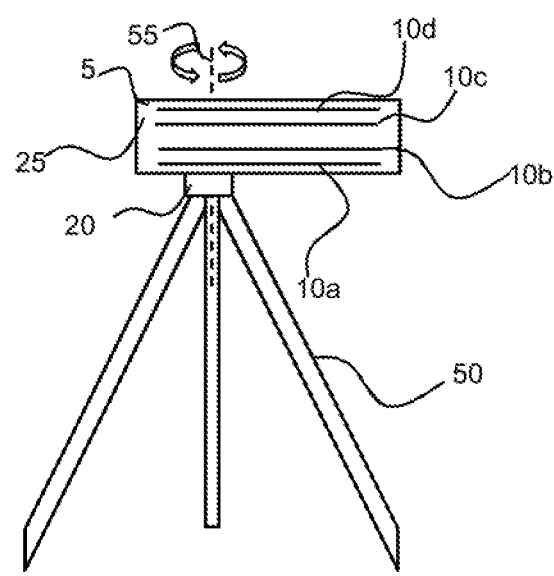
FIG. 4 is a front view of the camera of FIG. 1 rotatably mounted to a stand.

The camera 5 comprises the mount 20 for mounting the camera 5 to a stand, tripod or other suitable support 50 (see FIG. 4). When mounted on the stand, tripod or other suitable support 50, the sensor systems 10a, 10b, 10c, 10d extend generally horizontally and are distributed over a generally vertical direction. The total combined field of view of the sensor systems 10a, 10b, 10c, 10d extends substantially 180°, particularly extending at least vertically above the camera, or beyond, e.g. to cover the zenith. The total field of view can optionally also extend vertically below the camera, e.g. to cover the nadir, but this is less important, as the parts of the images and spatial data that comprise the stand, tripod or other support 50 (below the camera) may optionally not be used to prevent artefacts in the resulting model, image or virtual environment. Images and spatial data for regions comprising the stand, tripod or other support 50 can be collected by moving the stand, tripod or other support 50 and repeating the image collection procedure or by using the camera 5 in a roaming mode. However, the environment above the camera 5 could be of particular interest and as such, it is beneficial if the total field of view extends at least vertically upwards.

The mount 20 is configured to mount the camera 5 such that it is rotatable on the stand, tripod or other support 50. For example, in an embodiment, the camera 5 is optionally provided with a motor (not shown) such as a stepper motor that is operable to rotate the rest of the camera 5 with respect to the mount 20, such that when the camera 5 is mounted to the stand, tripod or other support 50, it is rotatable on the stand, tripod or other support 50 around a rotation axis 55 by the motor. In certain embodiments, the imaging sensors 35 of each sensor system 10a, 10b, 10c, 10d are distributed co-linearly or in parallel to the rotation axis 55. In certain embodiments each spatial sensor 30 is arranged such that one of the receivers 45a of the respective spatial sensor 30 is provided on an opposite side of the rotation axis to the other of the receivers 45b. In this way, parallax errors may be reduced.

Figure 3:
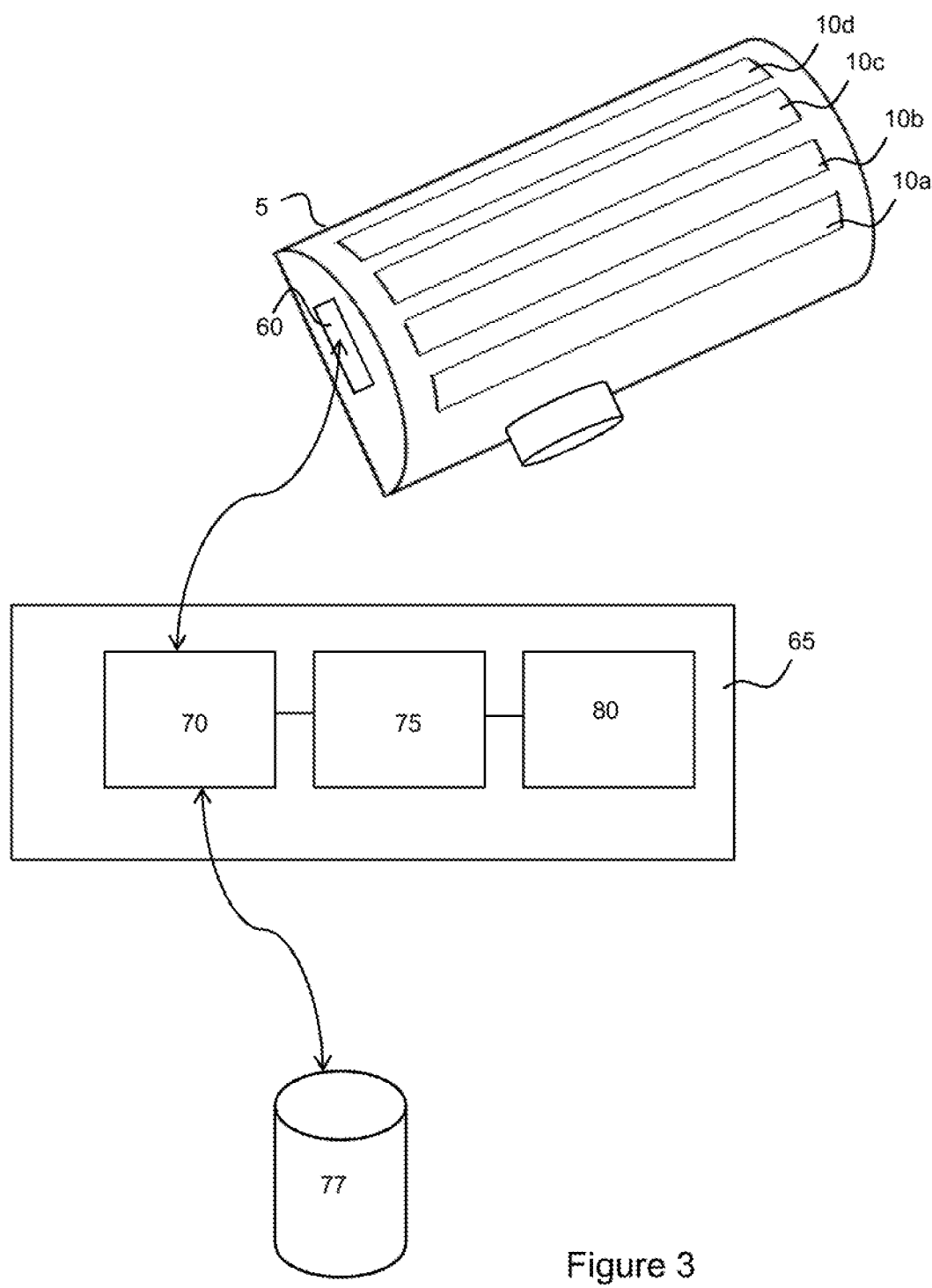
FIG. 3 is schematic diagram of an image processing system comprising the camera of FIG. 1.

In embodiments the camera 5 may be a "smart" camera, having image and spatial data processing capability on-board and configured to determine spatial 3D models, images and/or virtual environments therefrom. However, in certain embodiments, the camera 5 is a "dumb" camera, provided with a communications and interface module 60 for transmitting the spatial data and images collected to an external processing and/or control system 65 and to receive control commands therefrom, as shown in FIG. 3.

In particular, the communications and interface module 60 comprises a wired or wireless interface that interfaces with a communications module 70 of the processing and/or control system 65. The processing and/or control system 65 further comprises at least one processor 75 and data storage 80. The processor 75 in certain embodiments comprises one or more graphics processing units (GPUs). The data storage 80 may comprise RAM, flash memory, one or more hard drives and/or the like. The camera 5 in certain embodiments but not essentially has some form of data storage (not shown) on board for buffering or temporarily storing the spatial data and images until they can be communicated to the processing and/or control system 65. The processor 75 is operable to output a spatial model or virtual environment to a carrier medium 77 that can be access or loaded onto a virtual reality (VR) headset.

It will be appreciated that the camera 5 is configured to be operated in at least two modes, namely a mounted rotation mode and a roaming mode. The mounted rotation mode is particularly useful in determining an initial model and can be carried out as a highly automated process. The roaming mode is useful for filling in gaps or poorly imaged areas and allowing targeted image and spatial data collection from regions of particular interest and hard to access areas.

In the rotation mode, the camera 5 is rotated on the stand, tripod or other support 50, e.g. by operating the motor, as shown in FIG. 4. During the rotations, the camera 5 collects multiple images and spatial data at different rotational positions of the camera 5. It will be appreciated that this can be an automated process responsive to a suitable trigger, e.g. from the processing and/or control system 65, but not limited to this. The images and spatial data cover the full 360° around the camera 5 and also comprise multiple overlapping or partially overlapping images and spatial data. In this way, a full 360° model of the environment around the camera can be created by stitching together the images and spatial data collected. The overlapping or partially overlapping images and spatial data can be combined together in order to enhance the images and models produced. These processes will be described in more detail below.

In the roaming mode, the camera 5 can be detached from the stand, tripod or support 50, as shown in FIGS. 2 and 3, for example. In this mode, the camera 5 can be held by a user and manually pointed at areas selected by the user whilst images and spatial data are collected using the imaging sensors 35 and the spatial sensors 30.

Figure 5:
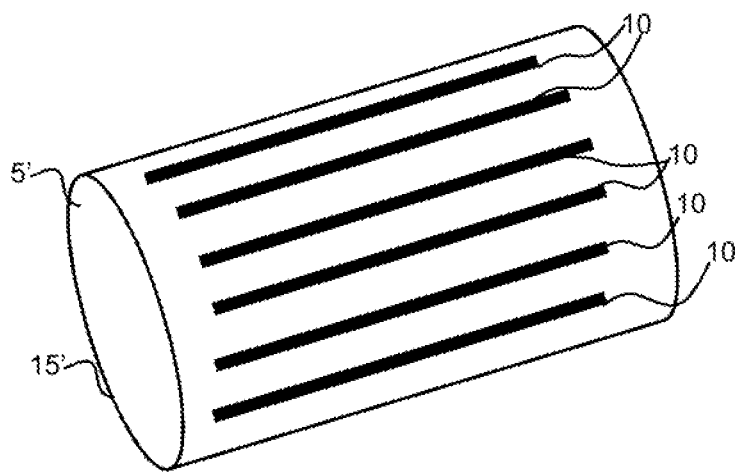
FIG. 5 is an alternative camera.
Figure 6:
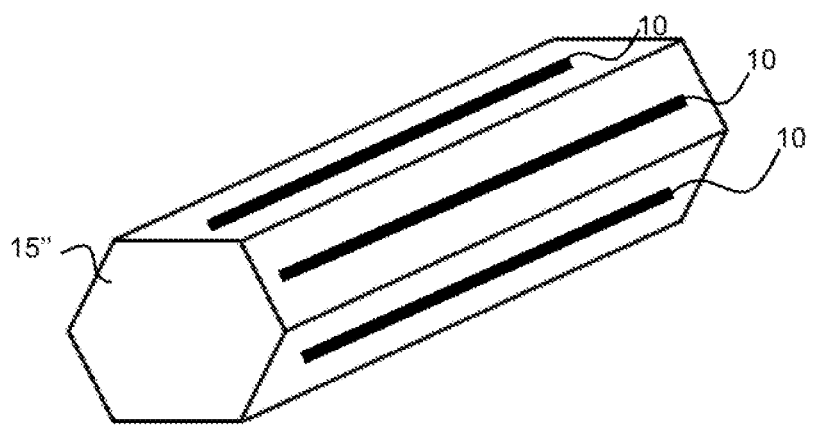
FIG. 6 is an alternative camera.

Although an example of a panoramic camera 5 in which four sensor systems are provided in a hemi-spherical housing is given above, it will appreciated that this need not be the case, In particular, more or less sensor systems 10a, 10b, 10c, 10d could be provided in order to provide different total fields of view or to produce higher or lower resolution images. For example, an example of a camera 5' having different numbers of sensor systems 10 and a different housing 15' configuration (e.g. cylindrical) is shown in FIG. 5. Furthermore, the housing 15" need not even be curved and the sensor systems 10 can be provided in differently angled flat surfaces of the housing 15" in order to produce the differently angled fields of view, an example of which is shown in FIG. 6. A skilled person would appreciate that the present invention is not limited to the examples shown but that other configuration could be provided that have the required multiple sensor systems provided with their fields of view at different orientations. For example, although in the examples shown above, the sensor systems 10a, 10b, 10c, 10d extend generally horizontally and are distributed over generally vertical direction (at least when mounted on the stand, tripod or other support 50), it will be appreciated that this need not be the case and instead the sensor systems 10a, 10b, 10c, 10d may be oriented vertically directions and distributed horizontally or may be oriented and distributed in an oblique direction. Indeed, although the sensor systems 10a, 10b, 10c, 10d are shown as generally parallel to each other, this need not be the case, and at least one of the sensor systems 10a, 10b, 10c, 10d may be oriented obliquely to at least one or each other sensor system 10a, 10b, 10c, 10d, for example. Furthermore, although the sensor systems 10a, 10b, 10c, 10d are shown on side or longitudinal faces of the housing, it will be appreciated that one or more sensor systems 10a, 10b, 10c, 10d could be provided on end faces of the housing and/or the housing could be generally spherical or hemi-spherical, for example, with sensor systems 10a, 10b, 10c, 10d distributed there around. It will also be appreciated that, depending on the arrangement, the camera 5 need not be rotatable and could be fixedly mountable on a stand, tripod or other support.

Figure 7:
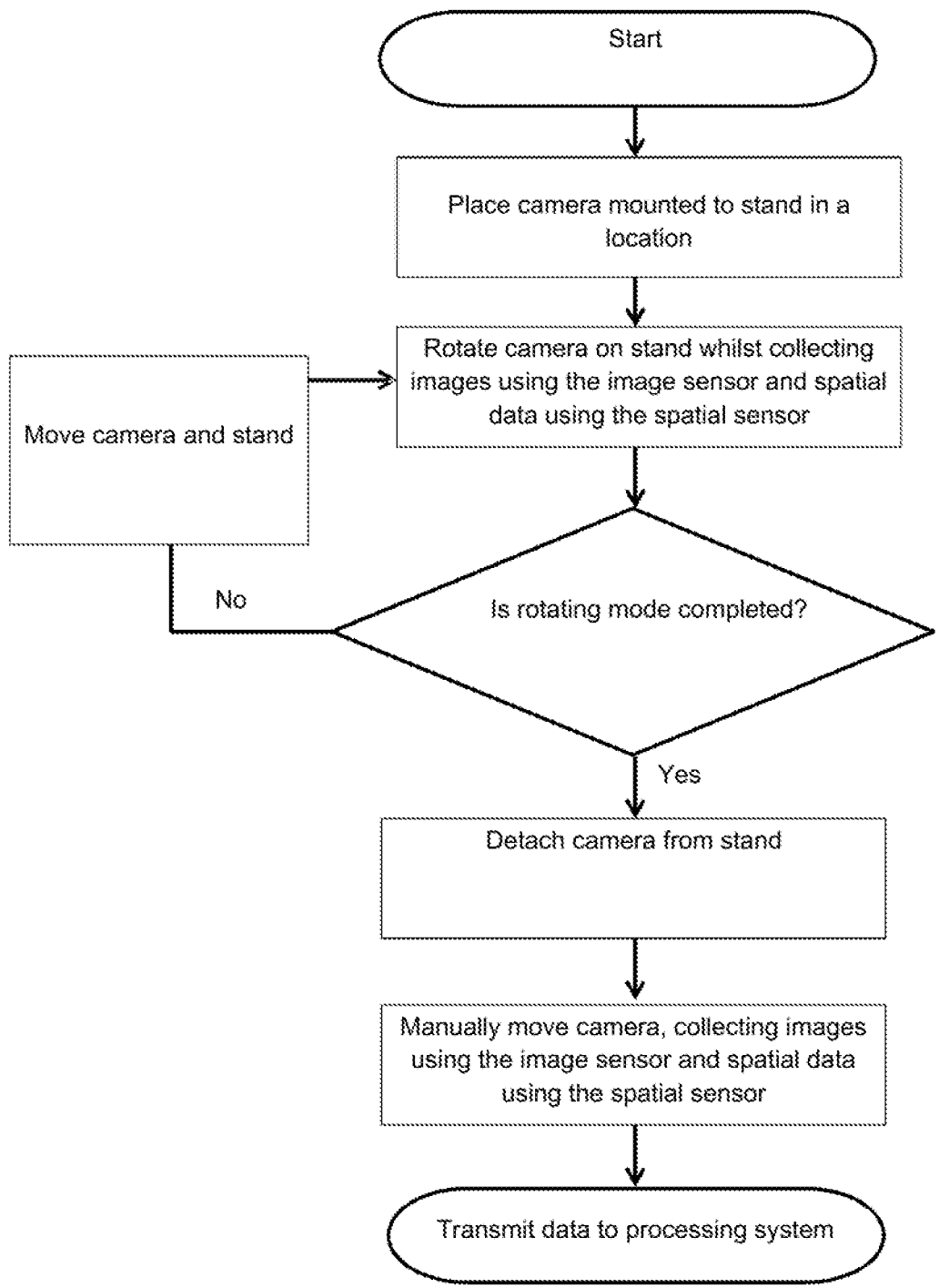
FIG. 7 is a flowchart of a method for collecting images and spatial data using the panoramic cameras of FIGS. 1, 5 and/or 6.

An example of a method for using panoramic cameras 5, 5', such as those of FIGS. 1 to 6 is described with reference to FIG. 7. The mount 20 of the camera 5, 5' is coupled to the stand, tripod or support 50. The rest of the camera 5, 5', particularly the part of the camera 5, 5' that comprises the sensor systems 10a, 10b, 10c, 10d, is then rotated around the mount 20 by the motor, with multiple images and spatial data being collected at certain known rotational positions that can be derived from the motor control. In particular, multiple images and multiple spatial data collections are performed at each rotational position. These images and spatial data can be combined together in order to improve image quality and spatial data quality. This combination can be performed by techniques known in the art, such as averaging and/or the like.

The user then has the option of collecting further images and spatial data in rotational mode if required. This involves moving the camera 5, 5' and the stand, tripod or other support 50 and repeating the rotational mode image and spatial data collection process again from the new position. Collecting images and spatial data from the camera 5, 5' in multiple positions in rotational mode allows gaps in the coverage of the images and the spatial data to be reduced or minimised. For example, in rotational mode, there can be images and spatial data that can't be used due to the presence of the stand, tripod or other support 50 in the field of view of at least one of the sensor systems 10a, 10b, 10c, 10d. Since the camera 5, 5' and stand 50 are moved, images and spatial data can be collected for areas for which the spatial data or images are missing or that have poorer coverage.

The user also has the option of detaching the camera 5, 5' from the stand, tripod or other support and using the camera 5, 5' in "roaming" mode. In this case, the user simply manually moves the camera 5, 5' and collects images and spatial data of any desired areas. This is particularly useful in collecting images and spatial data of hard to access areas such as underneath tables, behind obstacles and the like.

The images and the spatial data collected can be transmitted to the processing and/or control system 65 in real time or stored on the data storage on-board the camera and buffered for streaming or downloaded later to the processing and control system 65.

Figure 8:
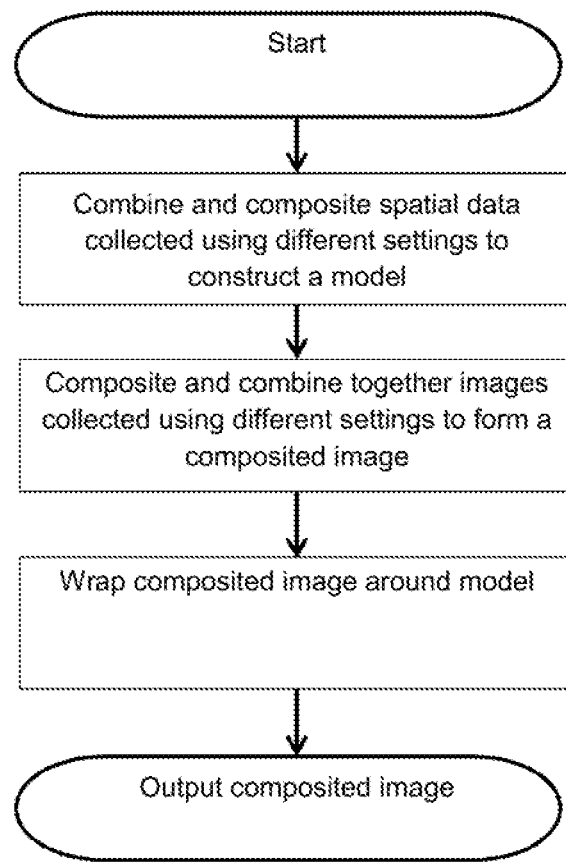
FIG. 8 is a flowchart of a method for forming spatial models from images and spatial data, such as that collected using the method of FIG. 6 and/or using the cameras of FIGS. 1, 5 and/or 6.

A method of forming spatial models or "virtual" 3D images or environments from the collected images and spatial data is described with reference to FIG. 8.

As described above in relation to FIG. 7, multiple images and spatial data for the environment being imaged or modelled can be collected. These multiple images and spatial data can be the result of multiple images and spatial data being collected for each camera 5, 5' position during a rotation on the stand, tripod or other support or for rotational positions of the camera 5, 5' taken during multiple rotations of the camera 5, 5', and/or images and spatial data the environment being modelled or imaged taken from different viewpoints or locations, such as different stand or tripod positions when used in the mounted rotational mode or when used in roaming mode.

It will be appreciated that some of the collected images and spatial data will wholly or partially overlap and that some of the images and spatial data will be for different parts of the environment and will not overlap.

The overlapping or partially overlapping images are combined in order to improve the quality of the image and spatial data for the associated locations in the environment being imaged. The combining of these images can comprise averaging or other image combining or merging techniques known to a person skilled in the art.

Advantageously, the multiple images and/or spatial data that is to be aggregated may be collected using different settings, such as exposure time, contrast, gain, power, sensitivity, shutter speed, and/or the like. In one example, the aggregation comprises high dynamic range (HDR) imaging. In this method, multiple images are collected at a given position of the camera 5, 5', wherein the images are taken with different exposures. The processing system 65 then produces the HDR images from the plurality of images collected with different exposures, which results in improved combined images. In another example, the spatial data for a given camera 5, 5' position can be collected with different gain settings of the spatial sensors 30 used to collect the spatial data. Some surfaces are detected better with different settings of the spatial sensors 30, e.g. different gain, power, or sensitivity settings. By using spatial data that is an aggregation of spatial data collected using different settings for the spatial sensors 30, such as gain, a wider range of objects and surfaces can be more accurately detected and analysed.

The images and spatial data for various locations within the environment can be stitched together in order to form the spatial model or virtual environment. In an embodiment, the processing and/or control system 65 uses pattern matching in order to identify features in the images and/or spatial data that match portions of the spatial model or virtual environment and/or other images or spatial data to determine where in the model or virtual environment the images and/or spatial data belong. Additionally or alternatively, the processing and/or control system 65 uses location and/or orientation sensors on the camera 5, 5' to determine where in the environment being modelled or imaged the camera 5, 5' is located and the direction in which it is pointed to determine the part of the environment being imaged, and thus where in the spatial model or virtual environment the associated images and spatial data should belong. It will be appreciated that this can be assisted by providing the processing and/or control system with structural data and calibration data associated with the camera, e.g. the number of sensor systems 10a, 10b, 10c, 10d, the relative orientations of each sensor system 10a, 10b, 10c, 10d and the like.

Furthermore, spatial data from a number of sources may be aggregated together. For example, partially or wholly overlapping images can be used to form stereograms from which distance and angle information for objects in the field of view can be extracted and used to supplement the spatial data collected by the spatial sensors 30.

In this way, the processing and/or control unit 65 is able to stitch together images taken from a variety of viewpoints and taken using the rotational mode and the roaming mode to form the spatial model and/or virtual 3D world.

In particular, the processing and/or control system 65 is configured to create a virtual spatial skeleton or construct from the aggregated spatial data. This defines the contours, shapes, positions and the like of any objects, walls and other surfaces in the environment to be imaged. The aggregated image data can then be wrapped to the spatial skeleton or construct to form the spatial model or virtual environment.

It will be appreciated that, since the model or virtual environment includes both spatial and image data, the user is free to view any object or surface in the model or virtual environment from any angle and sees an accurate representation of the environment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A panoramic camera comprising:
   a plurality of sensor systems, each sensor system comprising at least one spatial sensor and at least one image sensor, and
   a mount for mounting to a support for supporting the camera such that at least part of the camera is rotatable relative to the mount or support on which the camera is mounted around a rotational axis;

wherein:
at least part of a field of view of each of the sensor systems differs to at least part of the field of view of each other of the sensor systems;
the sensor systems are positioned such that at least part of the fields of view of each of the plurality of sensor systems, that respectively comprise fields of view of the at least one spatial sensor and the at least one imaging sensor of the respective sensor system, are distributed over a vertical direction, in use, such that a total field of view of all of the sensor systems extends above the camera; and
the image sensors of the sensor systems are positioned along or on the rotational axis or a surface or axis substantially parallel, co-linear or co-directional to the rotational axis.

2. The camera of claim 1, wherein at least one or each of the sensor systems is oriented differently to at least one or each other of the sensor systems.

3. The camera of claim 1, wherein the spatial sensor comprises at least one of a depth, distance, angle, or range sensor configured to determine at least one of distances or angles between the spatial sensor and locations on surfaces or objects within the field of view of the sensor and/or in the environment to be imaged or modelled.

4. The camera of claim 1, wherein the spatial sensor comprises a stereo sensor.

5. The camera according to claim 1, wherein at least one of the spatial sensors comprises at least two receivers and at least one transmitter.

6. The camera according to claim 1, wherein at least one or each spatial sensor comprises an infra-red sensor and/or the at least one image sensor is configured to take visual and/or optical images.

7. The camera according to claim 1, comprising at least three sensor systems.

8. The camera according to claim 1, wherein part of the field of view of at least one or more or each sensor system overlaps part, but not all, of the field of one or more adjacent sensor system.

9. The camera according to claim 1, wherein at least one or each sensor system is an integral or unitary sensor system in which the spatial sensor(s) and the imaging sensor(s) for a given sensor system are combined together into a single integral unit.

10. The camera according to claim 1, wherein the sensor systems or the respective optical or central axes of the field of view of at least two or more or each of the sensor systems are distributed or spaced apart over at least one direction or over at least one axis or surface.

11. The camera according to claim 10, wherein the surface is a curved axis or surface or a convex surface.

12. The camera according to claim 1, wherein the fields of view or optical axes of respective sensor systems are mutually divergent.

13. The camera according to claim 1, wherein the camera is operable in at least one of a mounted or a rotation mode in which the camera is configured to collect images and/or spatial data whilst the camera is mounted on the support, wherein, in the mounted or rotation mode, the camera is configured to collect at least one of images or spatial data: (a) whilst at least one or all of the sensor systems are being rotated around the rotational axis between rotations of the at least one or all of the sensor systems around the rotational axis, or (c) at one or more different rotational positions around the rotational axis.

14. The camera according to claim 1, wherein the camera is operable in a roaming mode in which the camera is manually at least one of movable, positionable, or orientable.

15. The camera according to claim 1, wherein the camera comprises or is configured to communicate with a processing system that is configured to create a model, composited image or virtual environment from the spatial data and/or the images collected from at least one or more or each of the sensor systems by combining or compositing the images collected by the image sensors with spatial data collected by the spatial sensors.

16. The camera according to claim 15, wherein:
the processing system is configured to form a 3D skeleton, framework or construct from at least the spatial data collected using at least one or more or each of the spatial sensors, the 3D skeleton, framework or construct comprising or defining one or more of: positions, spatial extents, shapes and orientations of one or more surfaces and/or objects; and
the processing system is configured to wrap, skin or overlay the 3D skeleton, framework or construct with at least one or more images collected using at least one or more or each of the imaging sensors or a combined image formed therefrom to form the model, composited image or virtual environment.

17. The camera according to claim 16, wherein the processing system is configured to alter or configure or reorient the one or more or each image to conform to the 3D skeleton, framework or construct.

18. The camera according to claim 15, wherein the camera is configured to collect images with the imaging sensor(s) and/or spatial data with the spatial sensor(s) using a plurality or range of settings of at least one or each of the imaging sensors and/or spatial sensors and the processing system being configured to combine a plurality of at least partially or wholly overlapping images and/or spatial data collected with different settings in order to form at least part of the model, composited image or virtual environment.

19. The camera according to claim 18, wherein the camera is configured to provide high dynamic range (HDR) imaging by producing HDR images from the plurality of images collected with different exposures.

20. The camera according to claim 15, wherein the processing system is configured to determine which part of the model, composite image or virtual environment the image or spatial data is associated with or belongs to.

21. A method of collecting modelling and/or imaging data of an environment to be imaged or modelled, the method comprising the step of:
Collecting spatial data and images of the environment using the panoramic camera according to claim 1, wherein the spatial data and images are collected using the plurality of sensor systems of the camera arranged such that at least part of the fields of view of at least two of the plurality of sensor systems, that respectively comprise fields of view of the at least one spatial sensor and the at least one imaging sensor of the respective sensor system, are distributed over a vertical direction, in use, such that a total field of view of all of the sensor systems extends above the camera.

22. The method of claim 21, comprising the step of collecting at least one of images or spatial data whilst the camera is mounted on the support and whilst at least one or all of the sensor systems are being rotated around the rotational axis or between rotations around the rotational axis, or at one or more different rotational positions around the rotational axis.

23. The method of claim 21 comprising the step of manually at least one of moving, repositioning, or re-orienting the camera and collecting images and spatial data at different positions and/or orientations of the camera.

24. A non-transitory carrier medium comprising a computer program product that, when loaded onto a processing and/or control apparatus and/or a camera comprising a processor, causes the processing and/or control apparatus and/or the camera to implement the method of claim 21.

25. A processing system for creating a model, composited image or virtual environment, the processing system comprising:
   at least one processor for creating the model, composited image or virtual environment,
   data storage for storing one or more images and spatial data of an environment to be imaged or modelled, and
   a communications or interface module for receiving the images and/or spatial data,
   wherein:
      the one or more images and spatial data are collected using the panoramic camera according to claim 1, and the one or more images and spatial data being indicative of fields of view of at least two of the plurality of sensor systems, that respectively comprise fields of view of the at least one spatial sensor and the at least one imaging sensor of the respective sensor system, that are distributed over a vertical direction such that a total field of view of all of the sensor systems extends above the camera.

26. A method for creating a model, composited image or virtual environment from one or more images and spatial data of an environment to be imaged or modelled, wherein at least one of the images and/or at least some of the spatial data relate to a different field of view to at least one other of the images or at least some other spatial data; and the one or more images and spatial data are collected using the panoramic camera according to claim 1, the one or more images and spatial data being indicative of fields of view of at least two of the plurality of sensor systems, that respectively comprise fields of view of the at least one spatial sensor and the at least one imaging sensor of the respective sensor system, that are distributed over a vertical direction such that a total field of view of all of the sensor systems extends above the camera.

* * * * *

UNITED STATES PATENT AND TRADEMARK OFFICE
CERTIFICATE OF CORRECTION

PATENT NO. : 10,681,329 B2  Page 1 of 1
APPLICATION NO. : 15/583393
DATED : June 9, 2020
INVENTOR(S) : Tocher et al.

It is certified that error appears in the above-identified patent and that said Letters Patent is hereby corrected as shown below:

In the Claims

At Claim 13, Column 19, Line 64, "rotational axis between" should read -- rotational axis, (b) between --

Signed and Sealed this
Second Day of February, 2021

Drew Hirshfeld
*Performing the Functions and Duties of the
Under Secretary of Commerce for Intellectual Property and
Director of the United States Patent and Trademark Office*